United States Patent
Fowe et al.

(10) Patent No.: US 10,760,918 B2
(45) Date of Patent: Sep. 1, 2020

(54) SPATIOTEMPORAL LANE MANEUVER DELAY FOR ROAD NAVIGATION

(71) Applicant: HERE Global, B.V., Eindhoven (NL)

(72) Inventors: James Fowe, Chicago, IL (US); Bruce Bernhardt, Chicago, IL (US); Filippo Pellolio, Sunnyvale, CA (US)

(73) Assignee: HERE Global B.V., Eindhoven (NL)

( * ) Notice: Subject to any disclaimer, the term of this patent is extended or adjusted under 35 U.S.C. 154(b) by 259 days.

(21) Appl. No.: 16/007,261

(22) Filed: Jun. 13, 2018

(65) Prior Publication Data

US 2019/0383626 A1 Dec. 19, 2019

(51) Int. Cl.
*G01C 21/34* (2006.01)
*G01C 21/30* (2006.01)
*G01C 21/36* (2006.01)
*G08G 1/01* (2006.01)

(52) U.S. Cl.
CPC ......... *G01C 21/3461* (2013.01); *G01C 21/30* (2013.01); *G01C 21/3658* (2013.01); *G08G 1/0133* (2013.01); *G08G 1/0145* (2013.01)

(58) Field of Classification Search
CPC .... G08G 1/0112; G08G 1/0133; G08G 1/167; G08G 1/0129; G08G 1/0141; G08G 1/0145; G01C 21/30; G01C 21/3658; G01C 21/3461
See application file for complete search history.

(56) References Cited

U.S. PATENT DOCUMENTS

| 8,849,515 B2 * | 9/2014 | Moshchuk | B62D 15/0265 340/435 |
| 2008/0180281 A1 * | 7/2008 | Bilimoria | G08G 1/164 340/936 |
| 2008/0272898 A1 * | 11/2008 | Irion | B60Q 9/008 340/436 |

(Continued)

FOREIGN PATENT DOCUMENTS

| JP | 2014089131 A | 5/2014 |
| WO | 2016184611 A1 | 11/2016 |

OTHER PUBLICATIONS

Gurupackiam, Saravanan and Steven Lee Jones Jr. "Empirical Study of Accepted Gap and Lane Change Duration Within Arterial Traffic Under Recurrent and Non-Recurrent Congestion." International Journal for Traffic & Transport Engineering 2.4 (2012).

(Continued)

*Primary Examiner* — Mussa A Shaawat
(74) *Attorney, Agent, or Firm* — Lempia Summerfield Katz LLC

(57) ABSTRACT

System and methods are provided for calculating a lane maneuver delay for different lane maneuvers and different road segments at different times of the day to generate a predicted lane maneuver delay for use in routing and navigation services. A lane-level map-matcher identifies the lane a vehicle is driving on using positional sensors. Sensor data is obtained from vehicle sensors using the left-turn and right-turn signal lights sensor. A lane maneuver delay value is calculated from the time period a left-turn or right-turn signaling light was kept on before a vehicle completed a lane maneuver. The lane maneuver delay values are aggregated to generate a predicted lane maneuver delay that may be used in lane level routing instructions.

20 Claims, 11 Drawing Sheets

(56) References Cited

U.S. PATENT DOCUMENTS

| | | | | |
|---|---|---|---|---|
| 2012/0065861 | A1* | 3/2012 | Hartmann | B60T 8/17551 |
| | | | | 701/71 |
| 2013/0194109 | A1* | 8/2013 | Clark | G01C 21/26 |
| | | | | 340/905 |
| 2014/0278052 | A1* | 9/2014 | Slavin | G08G 1/0145 |
| | | | | 701/400 |
| 2015/0224988 | A1* | 8/2015 | Buerkle | B60W 30/0956 |
| | | | | 701/45 |
| 2015/0331238 | A1* | 11/2015 | Roth | G06F 3/0481 |
| | | | | 348/115 |
| 2016/0101785 | A1 | 4/2016 | Takahashi et al. | |
| 2016/0334228 | A1* | 11/2016 | Wang | G01C 21/3691 |
| 2017/0080857 | A1* | 3/2017 | Herman | G01S 7/51 |
| 2017/0355368 | A1* | 12/2017 | O'Dea | B60W 30/12 |
| 2019/0155291 | A1* | 5/2019 | Heit | G05D 1/0088 |
| 2019/0232955 | A1* | 8/2019 | Grimm | G06N 3/08 |
| 2019/0286151 | A1* | 9/2019 | Palanisamy | G08G 1/00 |
| 2019/0329777 | A1* | 10/2019 | Rajab | G06N 5/04 |

OTHER PUBLICATIONS

Toledo, Tomer and David Zohar. "Modeling duration of lane changes." Transportation Research Record: Journal of the Transportation Research Board 1999 (2007): 71-78.

\* cited by examiner

SPATIOTEMPORAL LANE MANEUVER DELAY FOR ROAD NAVIGATION

FIELD

The following disclosure relates to navigation devices or services.

BACKGROUND

For mapping applications, maps and road traffic patterns have been built using only road geometry and intersections with little or no lane-level insight. As a result, it is difficult to report upcoming traffic congestion. The traffic attempting to turn off at the next junction might be backed up, while the cars that are going past it on the inner lane are travelling at normal speeds or vice versa. The difference in lane traffic and speeds may cause inefficiencies in routing and usage of a roadway network. The inefficiencies that come from poor choice of routes and lanes by individual drivers lead to congestion and delay for both the individual driver and other individuals traveling in other vehicles. Vehicles are unable to get to a destination on time and often are not certain of the best routes to take or which lanes of travel would be the fastest for their mission.

Existing navigation systems provide route guidance primarily by choosing routes based upon expected road segment travel times, turn penalties, and preferences for use of certain types or classes of roads. These systems may readily identify the locations where mandatory lane changes are required to traverse a recommended or chosen path but are not sensitive to the best lanes to use in various traffic situations and in different locations.

With lane level data, more effective routes and lane choices may be determined. However, even after acquiring lane level traffic data, generating accurate lane level traffic flow predictions may be inaccurate. The problem is that even though some services can predict lane level traffic, the services lacks a very important information which is the dynamics of traffic flow around lane transitions and lane maneuvers. While identifying that one lane is moving faster than another may be beneficial, without identifying how or when to switch into the lane, the lane level traffic information may lead to incomplete or erroneous results.

SUMMARY

In an embodiment, a method is provided for lane level maneuver guidance. A processor receives a first probe report for a vehicle comprising a first timestamp, a first road segment identifier, a first identifier for a first lane, and a first turn signal status indicating that a turn signal of the vehicle is active. The processor receives a second probe report for the vehicle comprising a second timestamp, a second road segment identifier, a second identifier for a second lane, and a second turn signal status indicating that the turn signal of the vehicle is off. The processor calculates a lane maneuver delay value for the first lane to the second land as a function of the first timestamp and second timestamp. The processor calculates an average maneuver delay value of a plurality of calculated lane maneuver delay values from the first lane to the second lane for the first road segment for a plurality of vehicles for a time period. The processor generates lane level maneuver instructions as a function of the average lane maneuver delay.

In an embodiment, a computer-readable, non-transitory medium stores a program that causes a computer to execute a method for providing lane level guidance. A plurality of time delays is determined for a plurality of lane maneuvers by a plurality of vehicles from a first lane to a second lane at a location. Each of the plurality of time delays are calculated from an initial detection of a turn signal of a vehicle of the plurality of vehicles to a subsequent detection that the turn signal is off for a maneuver from the first lane to the second lane, wherein the location comprises a strand of road segments. A lane maneuver matrix for the road segment is generated from the plurality of time delays. At least one lane level routing command is generated as a function of the lane maneuver matrix.

In an embodiment, a navigation system is provided for collecting lane maneuver transition data. The navigation system includes a turn signal sensor, a positioning sensor, a processor, and a transceiver. The turn signal sensor is configured to determine when a turn signal is on or off. The positioning sensor is configured to identify a road segment and a lane position for a vehicle. The processor is configured to generate a first probe report for a vehicle comprising a first timestamp, a first road segment identifier, a first identifier for a first lane, and a first turn signal status indicating that a turn signal of the vehicle is active; the processor further configured to generate a second probe report for the vehicle comprising a second timestamp, a second road segment identifier, a second identifier for a second lane, and a second turn signal status indicating that the turn signal of the vehicle is off. The transceiver is configured to transmit the first probe report and the second probe report to a mapping system.

BRIEF DESCRIPTION OF THE DRAWINGS

Exemplary embodiments of the present invention are described herein with reference to the following drawings.

DETAILED DESCRIPTION

Figure 1:
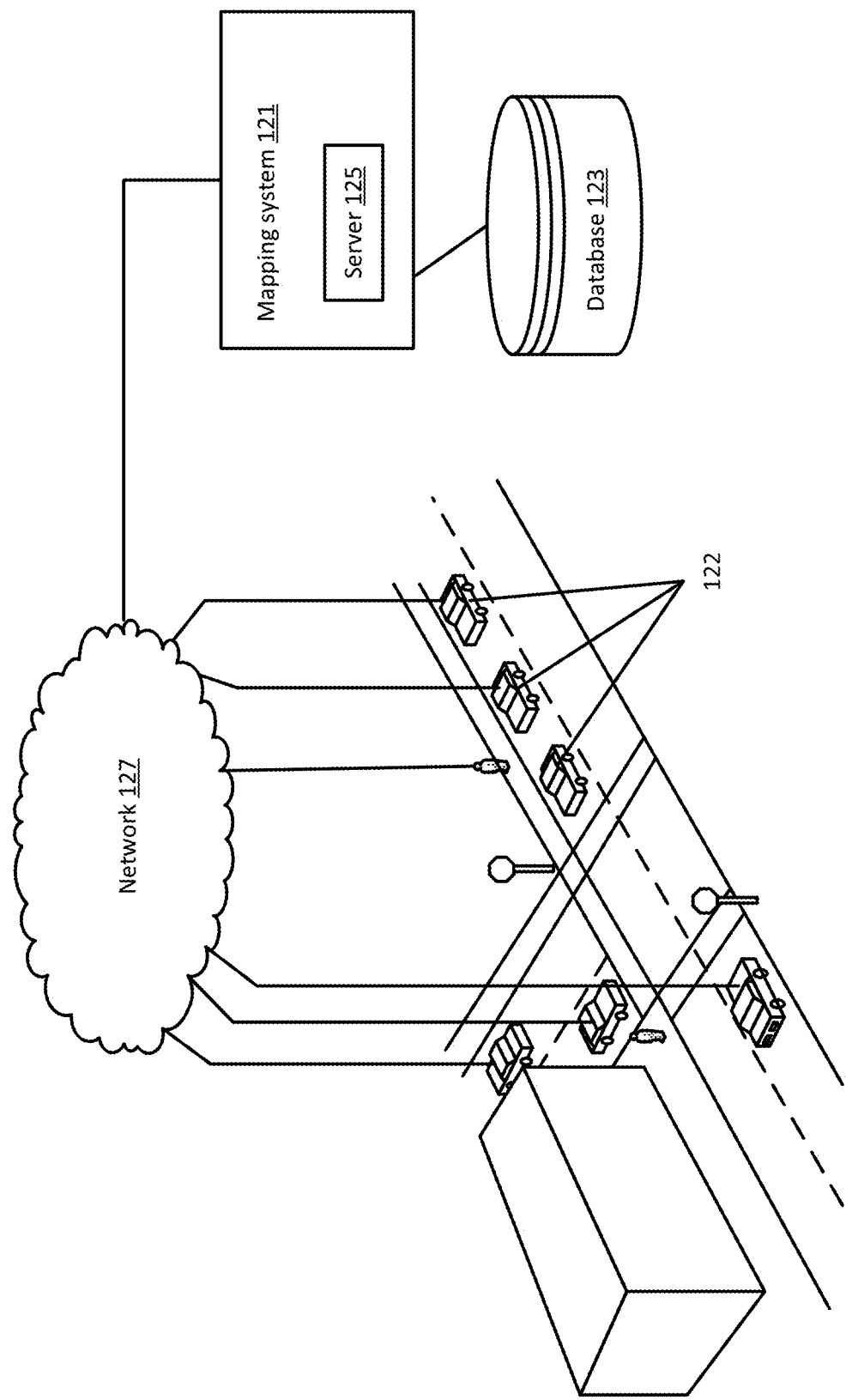
FIG. 1 depicts an example system for calculating a lane maneuver delay.

Embodiments described herein provide systems and methods for calculating a lane maneuver delay for different lane maneuvers and different road segments at different times of the day to generate a predicted lane maneuver delay for use in routing and navigation services. A lane-level map-matcher identifies the lane a vehicle is driving on using positional sensors. Sensor data is obtained from vehicle sensors using the left-turn and right-turn signal lights sensor. A lane maneuver delay value is calculated from the time period a left-turn or right-turn signaling light was kept on before a vehicle completed a lane maneuver. The lane maneuver delay values are aggregated to generate a predicted lane maneuver delay that may be used in lane level routing instructions.

High definition maps (HD maps) may provide lane level positioning to be used in navigation services. Using a combination of HD maps, global positioning systems (GPS), and/or sensors on a vehicle, a navigation system may determine a position and a lane location of a vehicle. With lane level positioning, lane level routing also is possible. Instead of a route that only provide road segments and turns, lane level routing may provide specific lanes for a vehicle to traverse increasing the efficiency of the route and the vehicle. Lane level traffic reports may be generated by detecting the lane location of probe vehicles. Lane level traffic reports, however, may be inaccurate if based solely on volume and speed of traffic in individual lanes. In order to provide accurate lane level traffic reports and subsequently lane level routing, it is important to have more information about movement of vehicles on the roadway beyond map information (if lane transition is allowed or not, etc.). It is important to identify the spatiotemporal traffic pattern around lane transition for ease of lane transition at different times of the day. Identifying the spatiotemporal traffic pattern provides vehicles and drivers more information to make informed lane choices when traversing a road segment.

At points in the day (low traffic, e.g. non-rush hour), it is easier to maneuver from one lane to another or on multiple lanes whereas at other times (e.g. rush hour), it is difficult to change lanes, as the volume of cars in the other lanes may cause a significant waiting time before a car can make a successful lane transition. Additionally, slow traffic in a lane waiting to merge into another lane may impede a vehicle's progress unnecessarily if it can be determined that another lane with less traffic can provide an equivalent route for the vehicle. For example, there are two lanes plus a turn lane on a road segment. During high volume times the turn lane is not sufficient to contain all the vehicle waiting to turn and the overflow back up into a lane that, at the lane level discrimination is only a through lane. However, the second through lane is not used for the overflow of the turn; and, consequently, is freely flowing, making it a preferred lane for a through maneuver. Beyond identifying one lane is faster, however, the transition from the first lane to the second lane must also be taken into effect. If, for example, the transition takes a large amount of time, any benefit from switching from the first lane to the second lane may be negated. Further, constant switching of lanes without any net benefit may also increase the possibilities of traffic incidents.

Embodiments provide a method for calculating a lane maneuver delay value for different road segments at different times of the day to generate lane maneuver delay predictions. Data for calculating the lane maneuver delay value may be obtained from automotive sensors using the left-turn and right-turn signal lights sensor. A lane-level map-matcher (LLMM) identifies a lane a car is driving on using GPS sensors. The total time period that a left-turn or right-turn signaling light was kept on before a driver completed his/her lane maneuver is measured. The duration of time the signaling light was on is taken as the lane maneuver delay for transitioning from the previous lane to the current lane. The data can be obtained from multiple vehicles for a roadway segment and stored as historical average for different times of the day.

FIG. 1 depicts a system for providing lane level routing guidance using lane maneuver delay data. The system includes one or more devices 122, a network 127, and a mapping system 121. The mapping system 121 may include or may be connected to a database 123 (also referred to as a geographic database or map database). The mapping system 121 may include one or more servers 125. Additional, different, or fewer components may be included.

The system includes one or more devices 122. The one or more devices may include probe devices, probe sensors, or other devices 122 such as personal navigation devices 122 or connected vehicles. The mapping system 121 may communicate with the devices 122 through the network 127. The mapping system 121 may also receive data from one or more systems or services that may be used to identify the location of a vehicle or roadway conditions. The device 122 may be a navigation system built into the vehicle and configured to monitor the vehicle. The devices 122 may also be integrated in or with a vehicle. The devices 122 may include mobile phones running specialized applications that collect location data as the devices 122 are carried by persons or things traveling the roadway system. The devices 122 may be configured to collect and transmit data including the location of a vehicle. The device 122 may be configured to provide lane leveling positioning of the vehicle on the roadway network. The devices 122 may be configured to monitor a turn signal of the vehicle and detect when the turn signal is turned on or turned off. The devices 122 may be configured to provide guidance for a user or vehicle.

The device 122 may be integrated into an autonomous vehicle or a highly-assisted or highly-automated driving (HAD) vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or comply with a routing or driving instruction from the device 122 or mapping system 121.

The device 122 may be configured as a navigation system for an autonomous vehicle or a HAD. Any of these assisted driving systems may be incorporated into the device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125. An autonomous vehicle or HAD may take route instructions based on a road segment and node information provided to the navigation device 122. An autonomous vehicle or HAD may be configured to receive routing instructions including lane level maneuver instructions from a mapping system 121 and automatically perform an action in furtherance of the instructions.

A HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the position of the vehicle and routing instructions.

ADAS vehicles include one or more partially automated systems in which the vehicle alerts the driver. The features may be used to provide alerts to the operator regarding upcoming features. ADAS vehicles may include adaptive cruise control, automated braking, or steering adjustments to keep the driver in the correct lane. ADAS vehicles may issue warnings for the driver based on the position of the vehicle either on a roadway or within a road network system.

The device 122 may be configured to provide lane level positioning of the vehicle. Lane level positioning may be provided using one or more sensor systems. Lane level positioning, for example, may be provided using a series of GPS points acquired by the device. Lane level positioning may be provided using light detection and ranging (LiDAR), radio detection and ranging (Radar), video, images, or other sensors on a vehicle. For example, the device 122 may determine a current lane position based on image recognition techniques and a stored HD map.

The device 122 is configured to monitor a turn signal mechanism. It is typical for a driver or vehicle to indicate an intention to transition lanes by turning a turn signal on (e.g. activating a blinker by pushing a button or moving a lever). Autonomous or semi-autonomous vehicles may automatically activate a turn signal in response to a routing instruction. Vehicles may have different indications, e.g. left and right blinkers, arrows, flashing lights, etc. The device 122 may monitor the physical mechanism or may receive signals from the vehicle or the turn signals that a turn signal has been turned on (active) or off (inactive).

The mapping system 121 and devices 122 are connected to the network 127. The devices 122 may receive or transmit data through the network 127. The mapping system 121 may receive or transmit data through the network 127. The mapping system 121 may also transmit paths, routes, or feature data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, DSRC (otherwise known as WAVE, ITS-G5, or 802.11p and future generations thereof), a 5G wireless network, or wireless short-range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The mapping system 121 may include multiple servers 125, workstations, databases, and other machines connected together and maintained by a map developer. The mapping system 121 may be configured to receive probe reports from the device 122 that include data relating to a lane maneuver. The mapping system 121 is configured to calculate a lane maneuver delay value. The mapping system 121 is configured to aggregate multiple lane maneuver delay values for certain times and locations. The mapping system 121 is configured to generate lane level routing instructions based on a predicted lane maneuver delay that is generated from the aggregated lane maneuver delay values. Each possible lane transitions for different road segments may be calculated from data from a device 122. The modal lane transitions and a corresponding average lane maneuver delay may be stored in the geographic database 123 as a lane maneuver delay prediction for different road segments.

The mapping system 121 may also be configured to generate routes or paths between two points (nodes) on a stored map. The mapping system 121 may be configured to provide up to date information and maps to external geographic databases 123 or mapping applications. The mapping system 121 may be configured to encode or decode map or geographic data.

The mapping system 121 may include one or more server(s) 125. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the road segments, segments, paths, or routes using historical, recent, or real time collected data.

The mapping system 121 includes the geographic database 123. In order to provide navigation related features and functions to the end user, the mapping system 121 accesses the geographic database 123. The mapping system 121 may use data from the geographic database 123 to store lane maneuver delay values. The mapping system 121 may use data from the geographic database 123 to predict a lane maneuver delay for a route.

Figure 2:
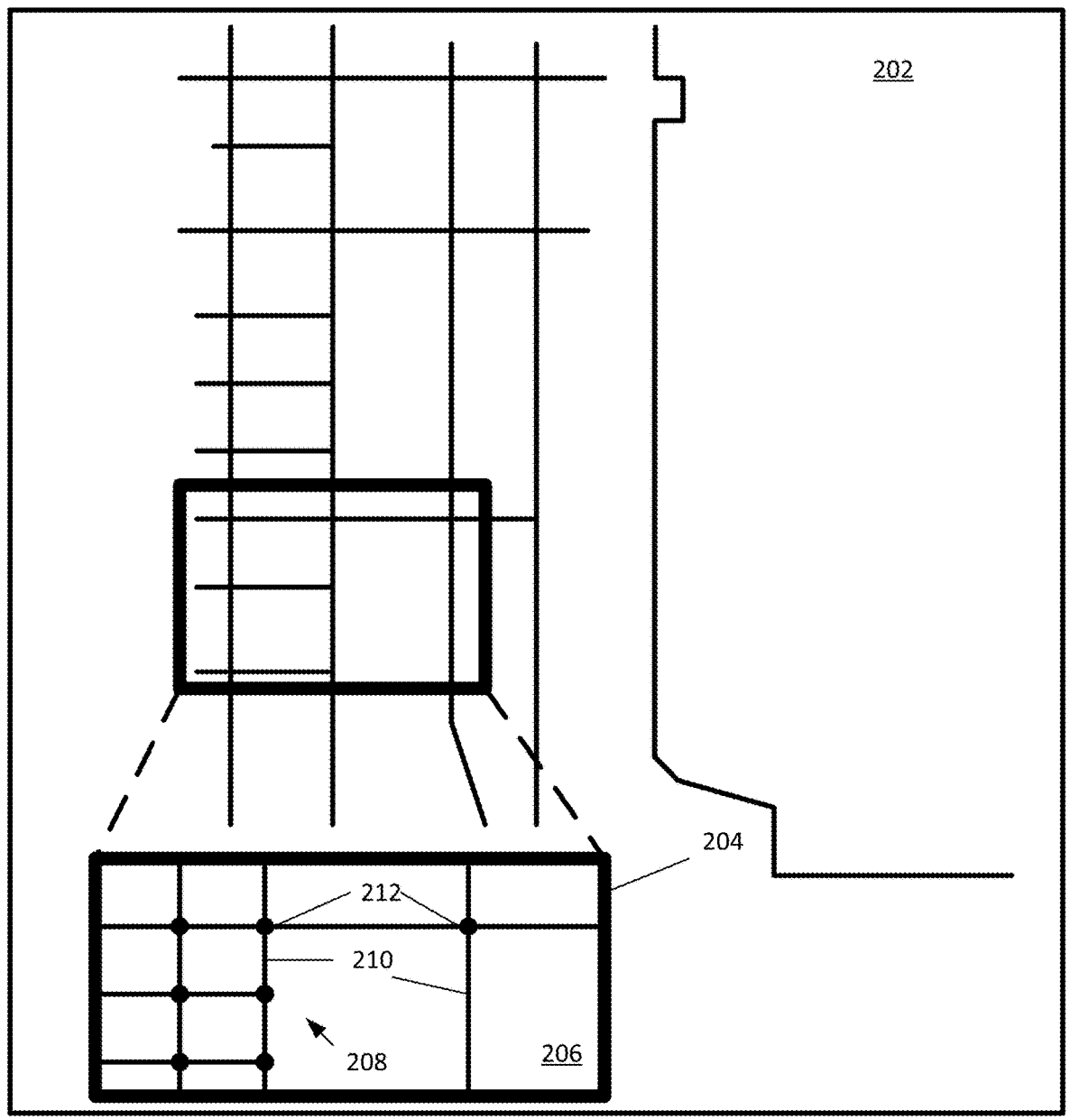
FIG. 2 illustrates a map of a geographic region.

The geographic database 123 includes information about one or more geographic regions. FIG. 2 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 2 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 3:
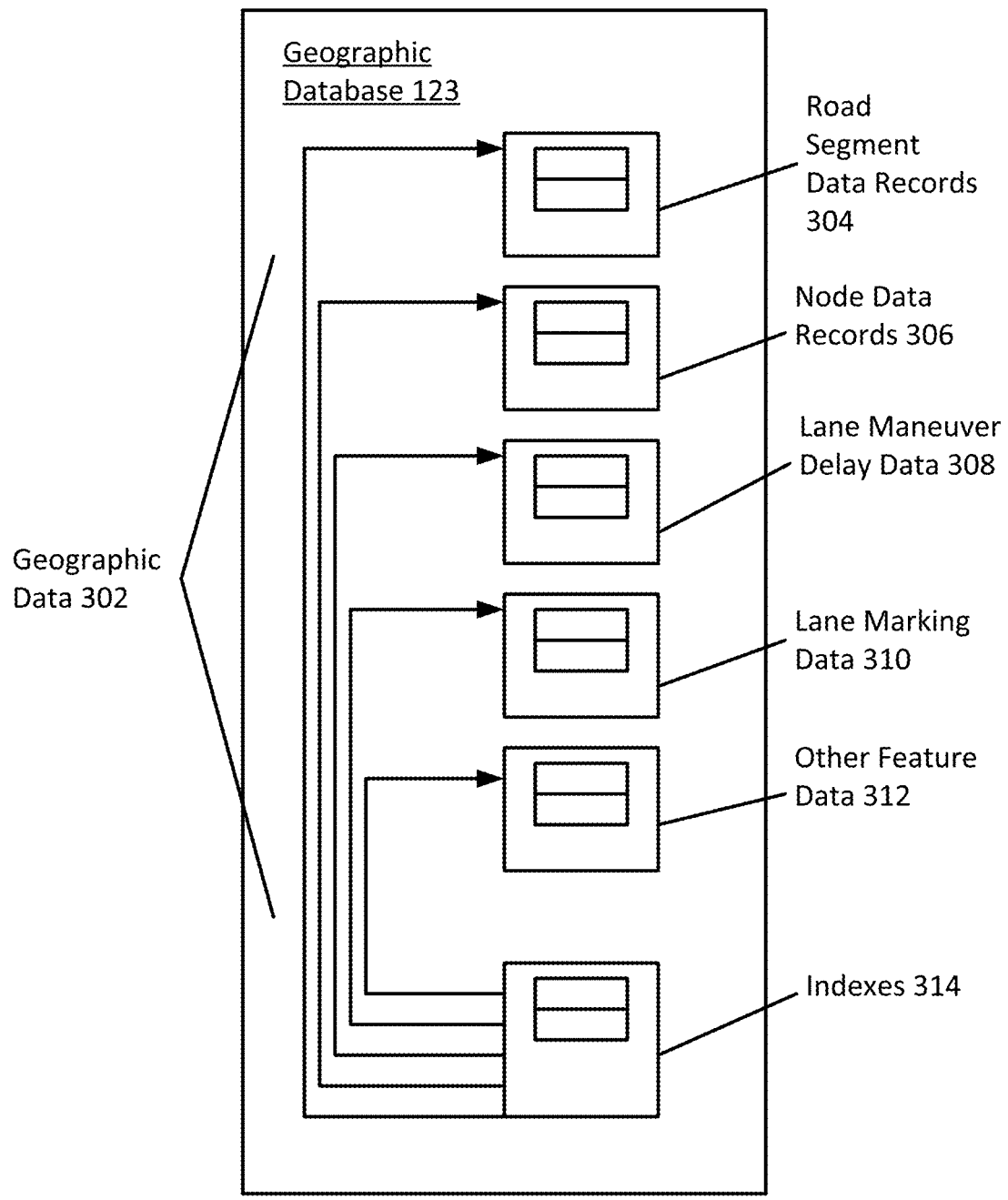
FIG. 3 illustrates a block diagram of a geographic database of FIG. 1.

As depicted in FIG. 3, in one embodiment, the geographic database 123 contains geographic data 302 that represents some of the geographic features in the geographic region 202 depicted in FIG. 2. The data 302 contained in the geographic database 123 may include data that represent the road network 208. In FIG. 3, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include lane maneuver delay data 308 that identifies a predicted lane maneuver delay for different lane maneuvers at different times. The lane maneuver delay data 308 may be further stored in sub-indices that account for different environmental factors or vehicles types. The feature data may include, for example, lane marking records 310 that indicate lane marking on the roadway or signage data 312.

The other kinds of feature data 312 may include point of interest data or other roadway features. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data may also include painted signs on the road, traffic signal, physical and painted features like dividers, lane divider markings, road edges, center of intersection, stop bars, overpasses, overhead bridges etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate feature data such as lane maneuver delay data 308 with a road segment in the segment data records 304 or a strand of road segments.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Actual observed feature data may be referred to as ground truth data. Remote sensing, such as aerial or satellite photography, may be used. The database 123 is connected to the server 125.

The geographic database 123 and the data stored within the geographic database 123 may be licensed or delivered on-demand. Other navigational services or traffic server providers may access the traffic data and the feature data stored in the geographic database 123. Data including feature data may be broadcast as a service.

Figure 4:
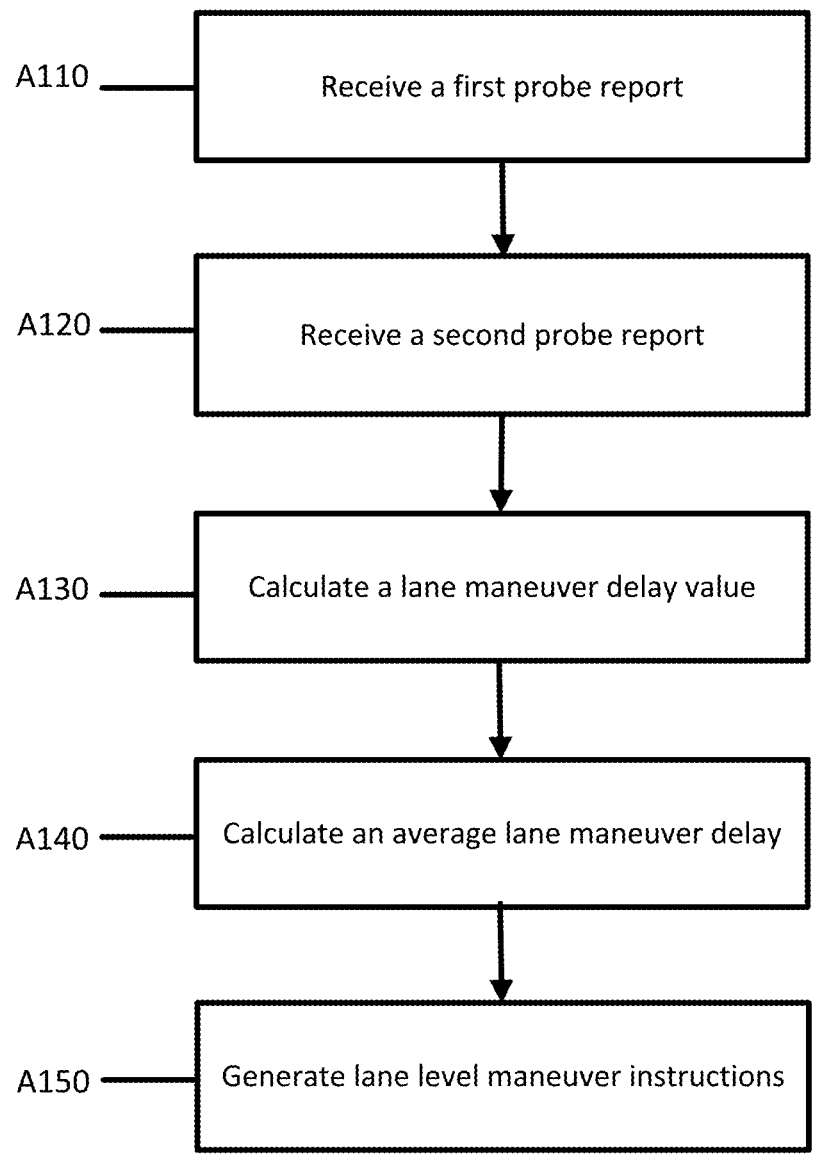
FIG. 4 depicts an example flowchart for calculating a lane maneuver delay.

FIG. 4 illustrates an example flow chart for providing lane level routing instructions. A lane level maneuver delay is calculated from a plurality of probe reports from vehicles on a road segment. The lane level maneuver delay is used to generate lane level guidance in terms of lane transition and maneuvers. The flowchart provides a method for calculating a measure of the level of difficulty for drivers to make maneuvers or lane transitions at different times of the day. The measure of the level of difficulty may be directly related to the lane level maneuver delay values (and averages of multiple values taken under similar circumstances, e.g. time, location, traffic conditions, weather, etc.). The measure of difficulty may help a driver or autonomous vehicle make good judgement on the road as to when and where to make lane transition maneuvers. As presented in the following sections, the acts may be performed using any combination of the components indicated in FIG. 1. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

Figure 5:
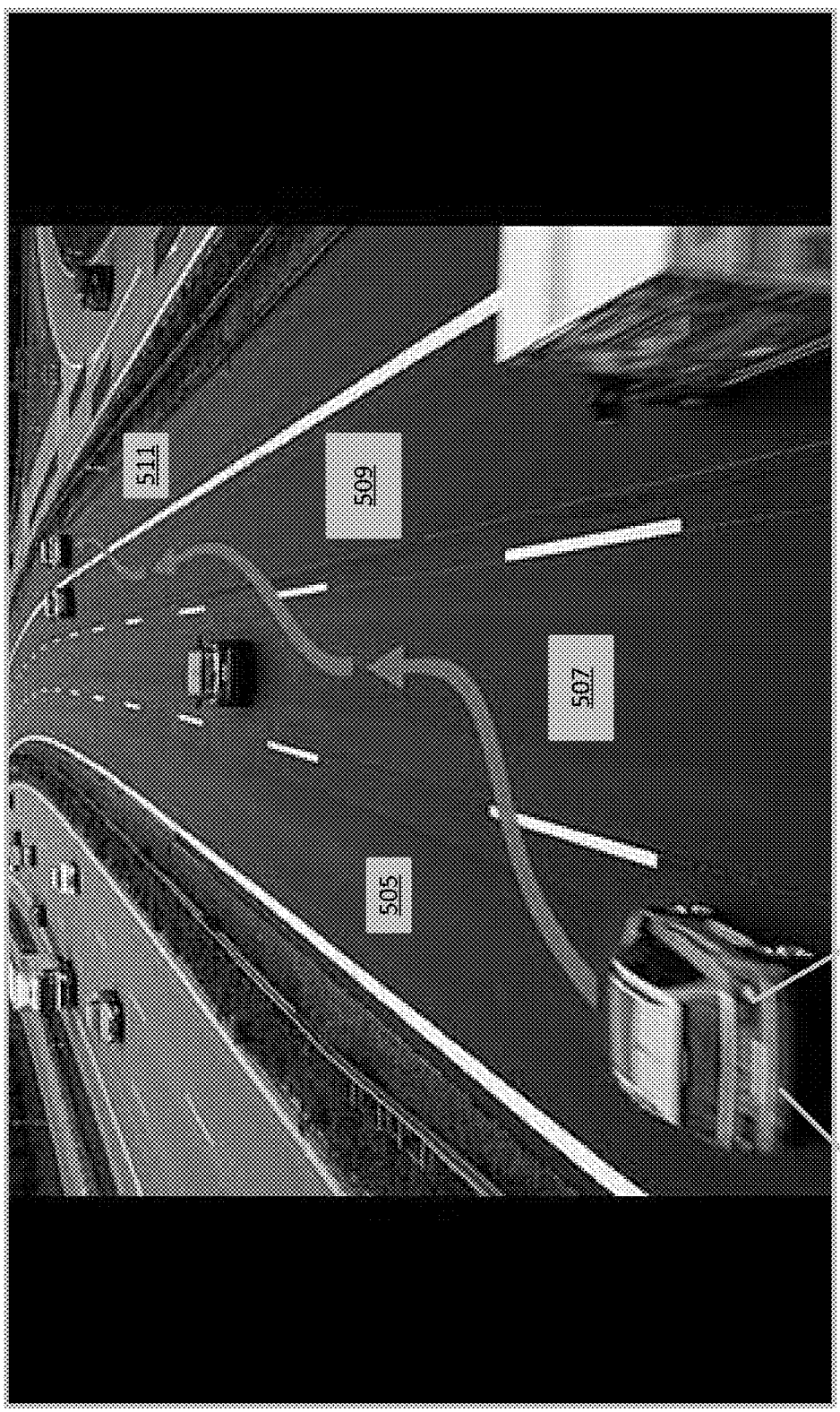
FIG. 5 depicts an example series of lane maneuvers.

FIG. 5 depicts a vehicle 501 performing lane transition maneuvers. In FIG. 5, the vehicle 501 has turned on a turn signal 503 to indicate that the vehicle is going to transition from lane 505 to lane 507. The vehicle 501 further continues from lane 507 to land 509 and on to the shoulder 511 of the highway. The maneuver by the vehicle 501 may be split into three different maneuvers or may be considered a single maneuver depending on if the vehicle turns off the turn signal 503 between switching lanes (and where any probe reports are captured). The lane maneuver delay for each maneuver may be calculated from the time an intent to turn is detected (e.g. a turn signal is turned on or by detecting other vehicular data) to the time the maneuver is completed (e.g. the turn signal is turned off or the vehicle has returned to normal operation) The turn signal data, vehicle data, the lane data, and the timing data, may all be acquired from probe reports that are generated by the vehicle as it traverses the roadway.

At act A110, the mapping system 121 receives a first probe report from a vehicle on a road segment comprising a first timestamp, a road segment identifier, a first lane identifier, and a first turn signal status indicated that a turn signal is active. The timestamp includes a value for the time the first probe report was generated. The timestamp may indicate a time down to the second, millisecond, or other time measurement. The road segment identifier and the first lane identifier may be determined using lane level positional methods. The probe report may be generated and transmitted by the vehicle or probe device to the mapping system 121 though the network 127. Probe reports may be transmitted in real time or may be stored and batched for later transmission.

A GPS value may be used to identify the road segment using a map matching algorithm to match the GPS coordinates to a stored map and road segment. Lane level map matching may provide a good estimate of what lane a vehicle is on given a sequence of GPS probes coming from the vehicle. Other sensor data may be used to identify the lane and road segment that the vehicle is on.

In an embodiment, road segments may be grouped together to form a road strand. A road strand may be defined as a sequence of similarly situated road segments. The road strand may be a compound road segment. To identify a road strand, sets of contiguous road segments are analyzed to determine whether the road segments are part of a strand should continue through the intersection. The analysis may involve identifying an angle ($\theta$) between a pair of adjacent road segments and compare the angle to a predetermined threshold. Various examples may be used for the angle (e.g., 90, 125, or 150 degrees). When the angle is greater than the predetermined threshold, the pair of adjacent road segments are associated in the same road strand. Other factors such as intersecting road segments may also be used to identify a road strand. An angle at which two road segments meet is determined and compared to a threshold angle. When the angle between two roads in the intersection is substantially straight (e.g., the angle exceeds the threshold), the two road segments are assigned to the same road strand. When the angle between two roads in the intersection is not substantially straight (e.g., the angle is less than the threshold), the two road segments are assigned to different road strands.

The turn signal status may be collected by monitoring the turn signal blinkers of a vehicle. The turn signal status may also be collected by monitoring a turn signal switch. The turn signals may also be monitored by an on-board computer that may provide the turn signal status to the device. The turn signal status may be a Boolean value representing whether one of the turn signals is switched on or not. For the first probe report, the turn signal status indicates that the turn signal is switched on.

In an embodiment, the turn signal status may not be used to determine an intent to maneuver. Drivers and vehicles may perform one or more actions when a driver or vehicle desires to make a lane maneuver. For example, a driver may speed up or slow down, accelerate, make a slight course change or other action. GPS and vehicular data may be collected for multiple lane maneuvers. Pattern recognition, for example using a machine learnt network, may be applied to the data to identify the actions that indicate an intent to change lanes. The actions may be detected by a device 122. The device 122 may use a time stamp of the actions as the start of the intent to change lanes. The delay calculated below at A130 may be determined from this time to when the lane change is complete.

Sensors may be used to capture the actions of a driver. For example, a video sensor may detect that a driver looks over to see if a lane is clear. Checking to see if the lane is clear in addition to other action may indicate that a driver intends to change lanes.

In an embodiment, other methods of determining that the vehicle is changing lanes may be used. For example, a device 122 may acquire data relating the operation or configuration of the steering mechanism of a vehicle. The device 122 may monitor the angle of the steering wheel and when the angle departs from a number of degrees (for example, 3, 6, or 9 degrees, among others) for a sustained time sufficient to cover the width of a lane, the vehicle may be treated as having changed lanes. A formula may be used for determining the sufficient time as a function of the wheel angle.

$$\text{Lane\_width} = \sin(\text{wheel\_angle\_from\_straight\_in\_radians}) \cdot \text{speed\_of\_vehicle} \cdot \text{time} \quad \text{EQUATION 1:}$$

In an example, if the vehicle is travelling 30 mph and the driver turned the steering wheel six degrees to the left, the vehicle would traverse to the next lane in a little less than 2.2 s for a road with 10-foot-wide lanes. The lane width may be identified in the geographic database 123. The speed may be determined using a vehicular sensor. If the vehicle is following a curved section of road, the additional displacement (or lack thereof) of the curve may be considered in the equation. In an embodiment, the device 122 may monitor the steering mechanism (e.g. wheel) or may monitor the wheels of a vehicle.

Another technique may use lateral acceleration sensors. The integral of method a) is obtained by determining a threshold of acceleration x time, above which a lane change would have occurred. The method may only detect that the change was of sufficient magnitude and direction to have a displacement greater than the lane width.

Gyro compasses, gyro-like compasses or magnetometers of sufficient sensitivity may also be used to indicate if the vehicle is or is not turning onto another road. For example, a value would be less than a 45-degree total change without a road curvature. Another method may use lateral acceleration method indicating initiation of a lane change, followed by lateral deceleration without a large change in direction to indicate completion of the lateral displacement. A determination of intent or completion of a lane change may be determined using individual techniques or a combination of multiple techniques. The probe report may include data from multiple sensors from which intent or completion may be derived.

At act A120, the mapping system 121 receives a second probe report from the vehicle on the road segment comprising a second timestamp, a second road segment identifier, a second lane identifier, and a second turn signal status indicated that the turn signal is off. The mapping system 121 may receive probe reports from the vehicle between the first probe report and the second probe report that do not indicate a change in the turn signal status. The intervening probe reports may be discarded or may be used to further analyze the lane maneuver delay. The intervening probe reports should indicate that a user or vehicle is still attempting to make a lane maneuver transition. In a scenario where a vehicle maneuvers across multiple lanes, the intervening probe reports may be used to calculate each individual lane change, e.g. from L1 (lane 1) to L2 (lane 2) and L2 to L3 (lane 3).

The second timestamp is later than the first and the difference represents an estimated time for the vehicle to perform the lane change maneuver. The second road segment identifier may be the same as the first road segment identifier. If the maneuver takes a long time, the second road segment identifier may be an adjacent road segment identifier or part of a strand of road segments that include the first road segment identifier. The second lane identifier is different from the first lane identifier (indicating a lane change).

At act A130, the mapping system 121 calculates a lane maneuver delay for the first lane to the second lane from the first probe report and the second probe report. Lane maneuver delays may be calculated for different maneuvers. For example, in a four-lane highway (L1, L2, L3, L4) there are twelve (12) potential lane maneuvers. A vehicle may transition from L1 to L2, L1 to L3, L1 to L4, L2 to L3, L2 to L4, L3 to L4, L2 to L1, L3 to L1, L4 to L1, L3 to L2, L4 to L2, and L4 to L3. Certain maneuvers may be accomplished within a single simple frame between probe reports. For example, a vehicle may transition from L1 to L3 from the time of a first probe report to a second probe report. This transition (and delay value) is stored under the L1 to L3 maneuver. A vehicle may transition from L1 to L3 but take additional time. In this scenario, three probe reports may be used to describe the transition. From L1 to L2 during the time between the first probe report and second probe report and from L2 to L3 from the time between the second probe report and third probe report. The two parts of the maneuver from L1 to L3 may be treated as separate events and/or as a single event.

Not all uses of turn signals are for changing lanes. Vehicles or drivers also use turn signals to indicate the onset of a turn onto a different road segment. The use of a turn signal to turn should be disregarded when calculating a lane maneuver delay. One method of removing the turns from the data is to perform a check to see if the two probes are in the same strand of road segments, e.g. that no intersections were traversed between the two probes. If an intersection was traversed between the first probe report and second probe report, the lane maneuver delay data may be disregarded.

A pseudocode for calculating a lane maneuver delay (LMD) is provided below:

```
insideManeuver = false;
maneuverStartTime = null;
maneuverStartLane = null;
maneuverStartLink = null;
// probes could be a generator in the real-time implementation and an
array in the batch for (probe in probes) {
    if (insideManeuver) {
        if (!probe.blinkerOn()) {
            // A maneuver was completed
            endLink = probe.road segment;
            endLane = probe.lane;
            if (noIntersectionsTraversed(maneuverStartLink, endLink)) {
                // The two probes are on the same topology segment, save the lane
                manuever delay value
                lane maneuver delay = probe.timestamp - maneuverStartTime;
                record LMD(LMD, maneuverStartLink, maneuverStartLane,
endLane); }// else an intersection was traversed, do nothing
            insideManeuver = false; }
        // else do nothing
    }else {
        if (probe.blinkerOn()) {
            // A maneuver is starting
            maneuverStartTime = probe.timestamp;
            maneuverStartLane = probe.lane;
            maneuverStartLink = probe.road segment;
            insideManeuver = true;
        }
        // else do nothing}}
```

At act A140, the mapping system 121 aggregates the lane maneuver delay with other similar lane maneuver delays for the location. The mapping system 121 may average lane maneuver delays for similar locations and similar times to calculate an estimate lane maneuver delay. Similar locations may include a road segment or a strand of road segments. Similar times may include thirty-minute increments, hourly increments, or other divisions of time. The mapping system 121 may also aggregate lane maneuver delays using other factors such as weather, type of vehicle, region, speed, traffic flow, or other factors. For example, the mapping system 121 may separate lane maneuver delays for large trucks from smaller passenger vehicles as each type of vehicle may operate differently. In another example, lane maneuvers in inclement weather may also be separated out as vehicles may require additional time.

Figure 6:
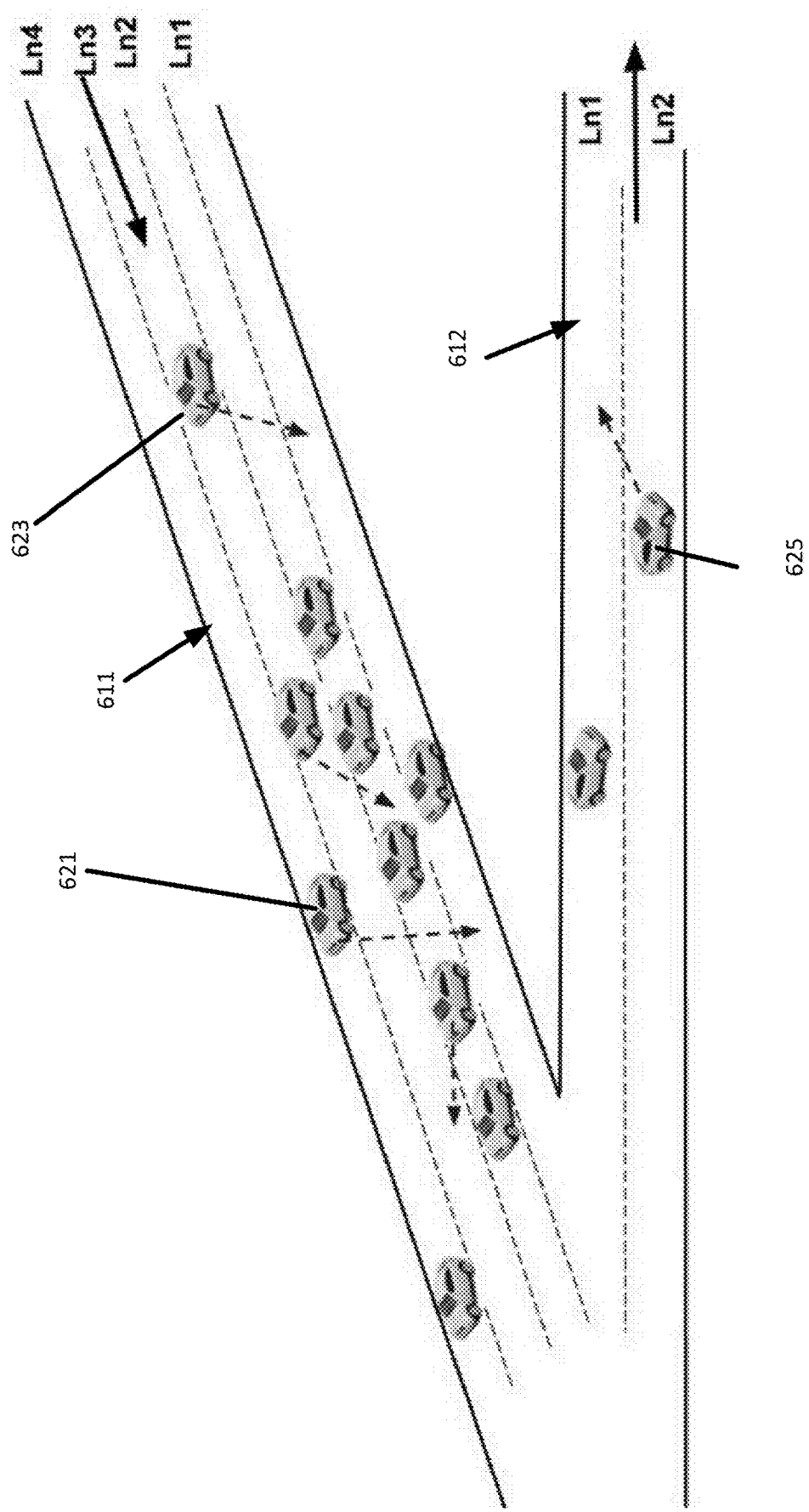
FIG. 6 depicts example road segments and lane maneuvers.

FIG. 6 depicts an example of different lane transistions. FIG. 6 depicts two road segments 611 and 612. Road segment 611 includes 4 lanes. Road segment 612 includes 2 lanes. Vehicles travering both road segment 611 and road segment 612 may manuever between the lanes. For example, a vehicle 621 may manuever from lane 4 to lane 1; a vehicle 623 may manuever from lane 3 to lane 1; a vehicle 625 from manuever from lane 1 to lane 2 on road segment 612; and so forth. Lane maneuver delay values may be calculated for each individual manuever and aggregated. In addition to lane changes, merging may also be tracked and recorded. For example, a vehicle merging may turn on a blinker to indicate the merge. The first probe report may indicate that the first lane is a first road segment and a first lane while the second probe report may indicate that the second lane is a second road segment and a first lane of the second road segment 1 (or a different road segment since the intersection may be considered a node). The sequence may be identified as a lane change manuever/merge and may be recorded as such. However, a vehicle that began on a lane and continues on what logically is the same lane may not be considered a "merging" vehicle as the vehicle does not change lanes in the road segments strand. The system may identify this manuever as a merge or change of lanes regardless by identifying that there is a node with a merging intersection.

In an embodiment, even if a maneuver ends on a downstream road segment, the lane maneuver delay value is assigned to the upstream (or decision) road segment as a vehicle turning its light signal on would possibly change lane immediately.

At act A150, the mapping system 121 generates lane level routing instructions as a function of the aggregated lane maneuver delay. The mapping system 121 uses an estimated lane maneuver delay based on the aggregated lane maneuver delay to assist in calculating when or if a vehicle should change lanes during a route from a starting point to a destination. The estimated lane maneuver delay may be the average lane maneuver delay or may be adjusted based on existing conditions (for example, type of vehicle, speed, traffic flow, weather conditions, lighting, etc.). The level of difficulty for a vehicle to make a maneuver may be taken into account. For example, a small highly maneuverable sports car may be able execute a lane change maneuver relatively quickly compared to a large truck. Advanced knowledge that a truck may find it difficult to change lanes for number of kilometers may help advise a truck driving system to find an optimal lane (or route) for the foreseeable distance and stay in that lane, thereby enhancing safety of the overall road network.

In an embodiment, the mapping system 121 may provide real-time updates when there are enough numbers of probe reporting vehicles on the roadway. Updates on high lane maneuver delays may be part of real-time traffic flow report. Drivers, vehicles, or navigation services may make decisions based on the reported delays for lane maneuvers.

Figure 7:
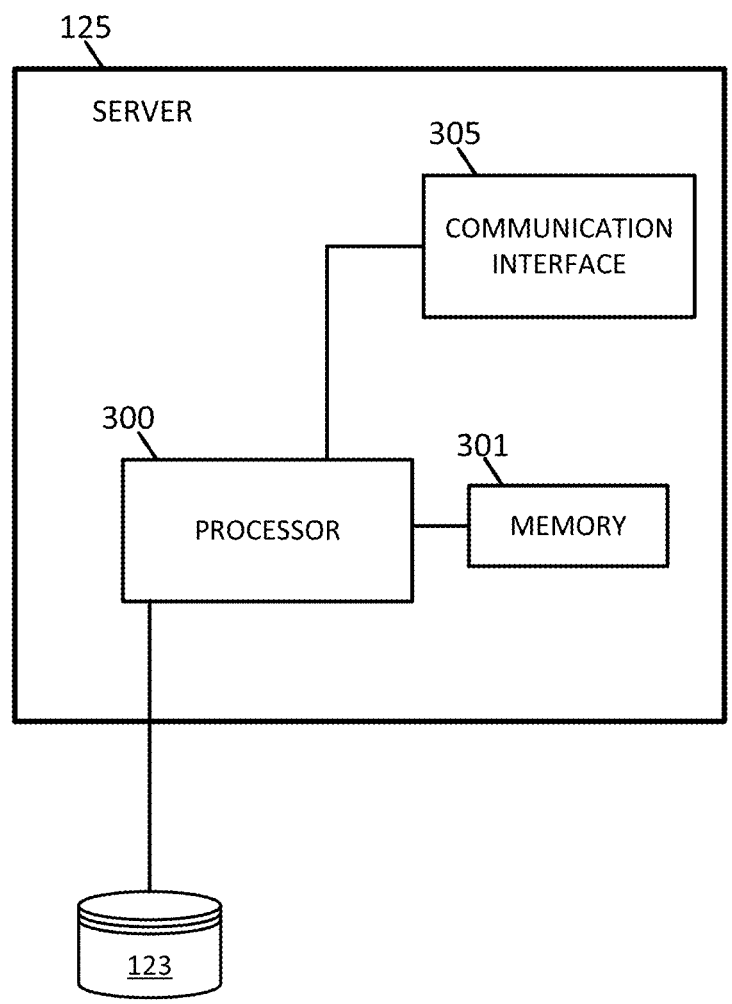
FIG. 7 depicts an example server of the system of FIG. 1.

FIG. 7 illustrates an example server 125 of the system of FIG. 2. The server 125 includes a processor 301 that is connected to a communications interface 305 and a memory 303. The processor 301 is also connected to the geographic database 123. The communications interface 305 is configured to receive vehicle data from a vehicle. The memory is configured to store vehicle data and lane maneuver delay data. The processor 301 is configured to calculate a lane maneuver delay value from the vehicle data. The processor 301 is configured to aggregate lane maneuver delay values for a road segment and a time period to determine a predicted lane maneuver delay value. The processor 301 is configured to generate lane level maneuver instructions based on the predicted lane maneuver delay value.

The processor 301 may include a general processor, digital signal processor, an application specific integrated circuit (ASIC), field programmable gate array (FPGA), analog circuit, digital circuit, combinations thereof, or other now known or later developed processor. The processor 301 may be a single device or combinations of devices, such as associated with a network, distributed processing, or cloud computing.

The communications interface 305 may include any operable connection. An operable connection may be one in which signals, physical communications, and/or logical communications may be sent and/or received. An operable connection may include a physical interface, an electrical interface, and/or a data interface. The communications interface 305 provides for wireless and/or wired communications in any now known or later developed format. The communications interface 305 may include a receiver/transmitter for digital radio signals or broadcast mediums.

The memory 303 may include one or more of a read only memory (ROM), random access memory (RAM), a flash memory, an electronic erasable program read only memory (EEPROM), or other type of memory. The memory is configured to store data for the probe report and lane maneuvers.

Figure 8:
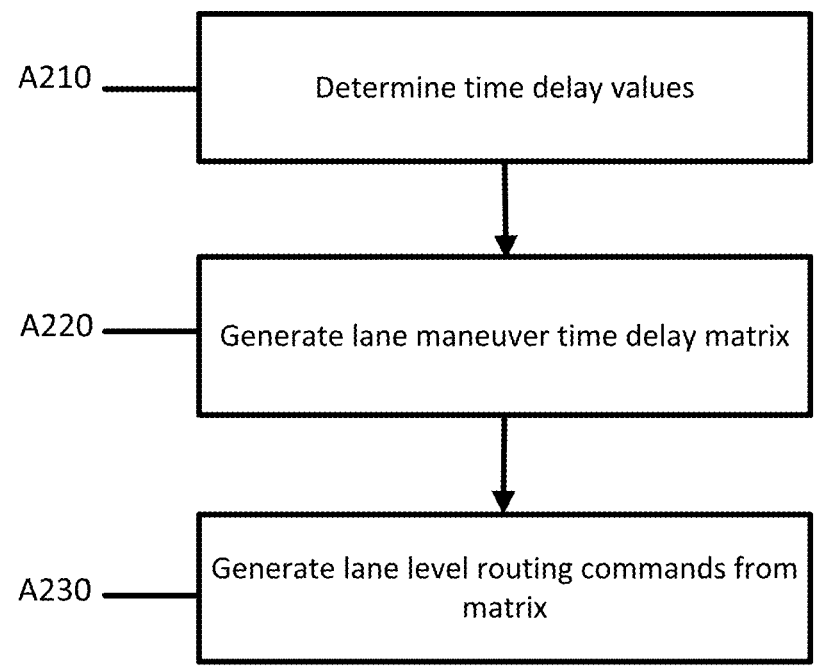
FIG. 8 depicts an example flowchart for calculating a lane maneuver delay.

FIG. 8 depicts an example method of generating spatiotemporal patterns of lane maneuver delay for navigational guidance using the server 125 of FIG. 7. The method uses probe data (i.e. vehicle sensor data) including location (road segment id, lane) of a vehicle, status of the vehicle's turn signal (i.e. on or off) and timestamp. The method uses lane level map matching to identify a lane where the vehicle is driving and determines a time period (e.g. lane maneuver delay) during which a turn signal of the vehicle was active before a vehicle completed the lane maneuver (e.g. time during which the vehicle changed from a lane to another lane). The method obtains lane maneuver delay for vehicles at different locations (e.g. road segments or strands of road times. Similar locations may include a road segment or a strand of road segments. Similar times may include thirty-minute increments, hourly increments, or other divisions of time. The processor 301 may also aggregate lane maneuver delays using other factors such as weather, type of vehicle, region, speed, traffic flow, or other factors. For example, the processor 301 may separate lane maneuver delays for large trucks from smaller passenger vehicles as each type of vehicle may operate differently. In another example, lane maneuvers in inclement weather may also be separated out as vehicles may require additional time.

In an embodiment, each road segment with (n) number of lanes maintains a matrix of possible lane transitions at different time epoch t of the day or week. Each entry is the average of time delays for the particular lane maneuver. An example matrix is listed below:

| | (Segment-ID, time) | | | | |
|---|---|---|---|---|---|
| Segment/LMD | 1 | 2 | 3 | ... | n |
| 1 | 0 | <LDM(seconds)> | <LDM(seconds)> | ... | <LDM(seconds)> |
| 2 | <LDM(seconds)> | 0 | <LDM(seconds)> | ... | <LDM(seconds)> |
| 3 | <LDM(seconds)> | <LDM(seconds)> | 0 | ... | <LDM(seconds)> |
| ... | ... | ... | ... | 0 | ... |
| n | <LDM(seconds)> | <LDM(seconds)> | <LDM(seconds)> | ... | 0 | segments) at different times and generates a spatiotemporal lane maneuver delay pattern (e.g. historical averages). As presented in the following sections, the acts may be performed using any combination of the components indicated in FIG. 1, FIG. 7, or FIG. 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, the processor 301 determines a plurality of time delays for a plurality of lane maneuvers by a plurality of vehicles from a first lane to a second lane at a location. Each of the time delays of the plurality of time delays may be calculated from an initial detection of a turn signal of a vehicle of the plurality of vehicles to a subsequent detection that the turn signal is off for a maneuver from the first lane to the second lane. In order to exclude events where the turn signal is used for turning onto a different segment, the processor 301 may ignore or discard any instances where the location straddles an intersection with a possible turn. The time delays may alternatively be calculated by comparing the operation of the vehicle to a collection of stored maneuver data. An intent to change lanes may be determined by comparing, for example, an acceleration or speed of the vehicle to historical data for vehicles that executed a lane maneuver. Historical maneuver data may be analyzed to identify actions that precede a lane maneuver. A machine learnt network may be used to identify the actions. Other techniques may be used to analyze the historical data. The time delay may be calculated from a time that intent is detected to a time that the lane maneuver is complete.

Figure 9:
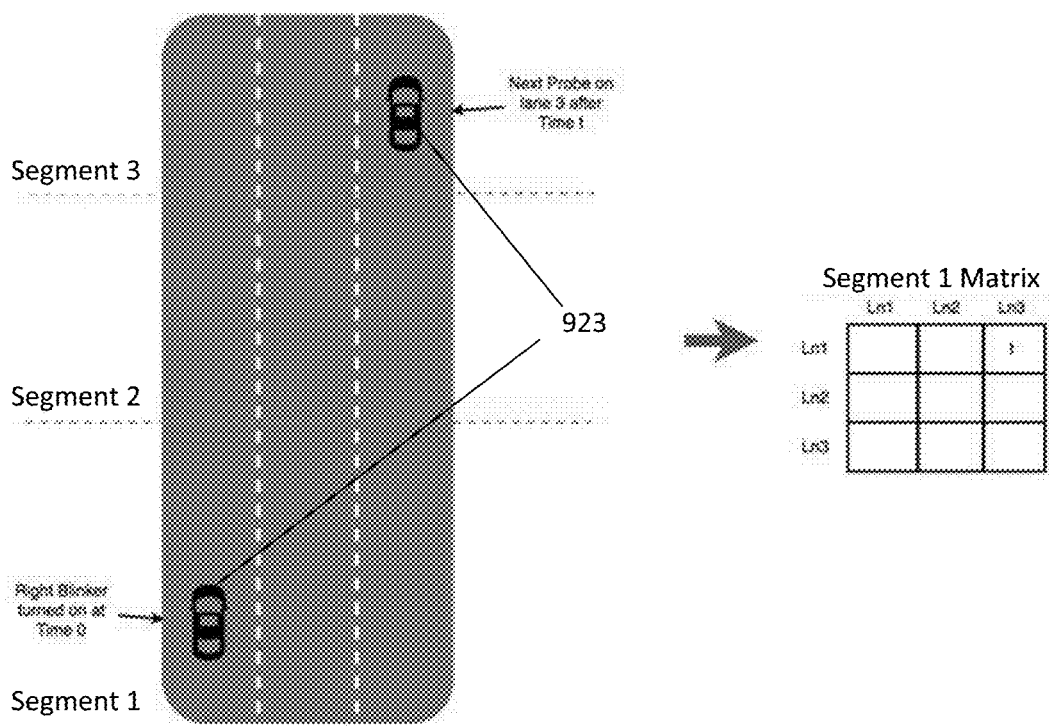
FIG. 9 depicts an example lane maneuver across multiple road segments.

At act A220, the processor 301 generates a lane maneuver matrix for the road segment from the plurality of time delays. The lane maneuver matrix may store time values for each possible maneuver on a road segment. Each entry in the matrix may represent an average maneuver delay time for a particular maneuver. The processor 301 may generate average lane maneuver delays for similar locations and similar FIG. 9 depicts an example of a lane maneuver delay added to a matrix. In FIG. 9, a vehicle 923 on road segment 1 maneuvers from a first lane to a third lane. The maneuver occurs across three different road segments 1, 2, and 3. A first probe is acquired at Time 0. A subsequent probe is acquired at time t. The value (t) is added to the matrix for segment 1 (not segment 2 or 3) in the appropriate entry.

At act A230, the processor 301 generates lane level routing commands as a function of the lane maneuver matrix. The processor 301 may transmit the lane level routing commands a part of a routing instruction to a vehicle or navigation device 122. In an example, a navigation device 122 may request a route from a starting point to a destination. The processor 301 may generate routing instructions including road segments, turns, and lane level maneuver instructions based on traffic reports and other data, for example, included in the lane maneuver matrix. The lane maneuver matrix includes data that describes an average delay for performing a lane change. The average delay may assist the processor 301 in determining an accurate and efficient route to the destination (e.g. by taking into account the delay for lane maneuvers).

Figure 10:
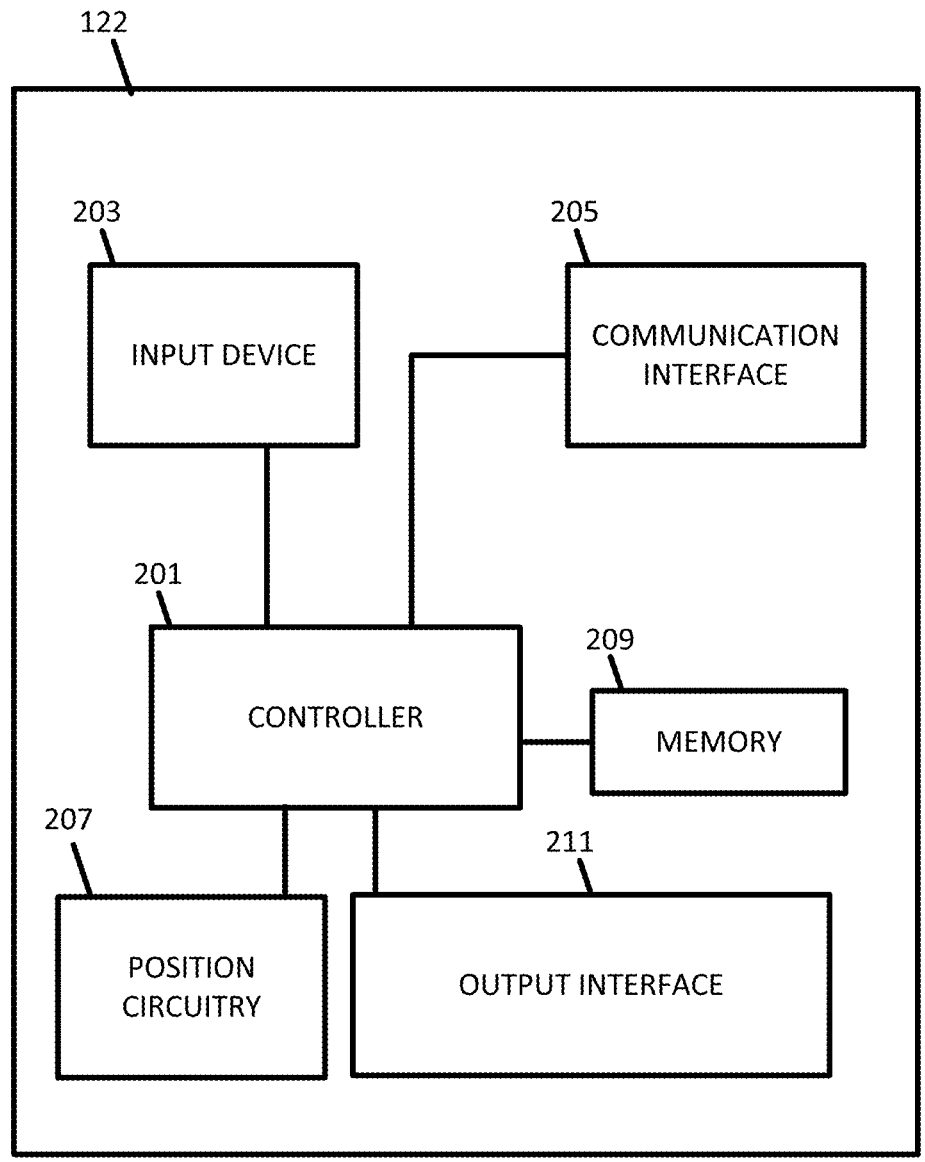
FIG. 10 depicts an example device of the system of FIG. 1.

FIG. 10 illustrates an example device 122 of the system of FIG. 1 that may be configured to receive and execute lane level routing commands. The device 122 may be configured to collect, transmit, receive, process, or display data. The device 122 may also be referred to as a probe 122, a mobile device 122 or a navigation device 122. The device 122 includes a controller 201, a memory 209, an input device 203, a communication interface 205, position circuitry 207, and an output interface 211. Additional, different, or fewer components are possible for the mobile device 122. The device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

Figure 11:
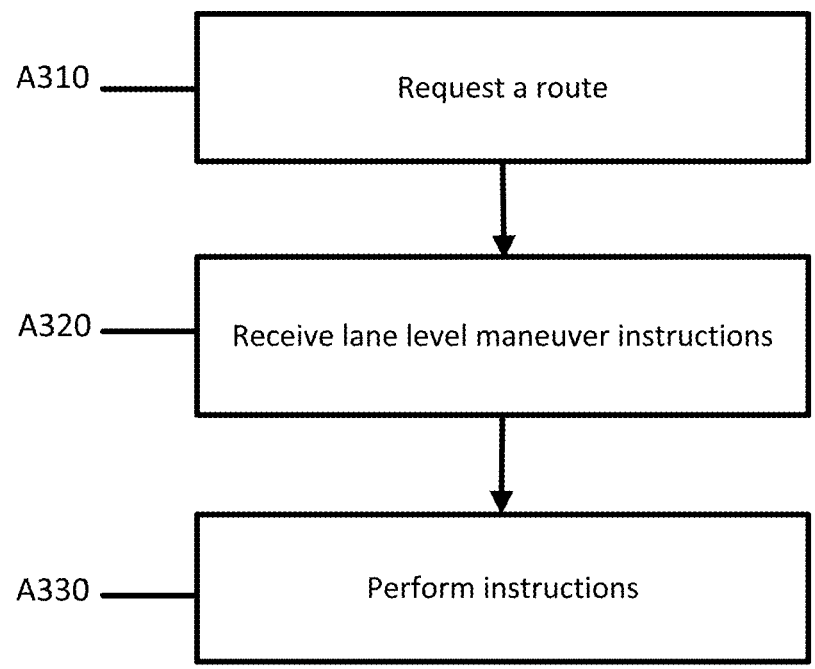
FIG. 11 depicts an example flowchart for performing lane level maneuvers.

FIG. 11 depicts an example workflow for performing a lane maneuver. As presented in the following sections, the acts may be performed using any combination of the components indicated in FIG. 1, FIG. 7, or FIG. 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A310, the controller 201 requests a route from a starting location to a destination. The controller 201 may include a general processor, digital signal processor, an application specific integrated circuit (ASIC), field programmable gate array (FPGA), analog circuit, digital circuit, combinations thereof, or other now known or later developed processor. The controller 201 may be a single device or combinations of devices, such as associated with a network, distributed processing, or cloud computing. The controller 201 may be configured to generate lane level routing commands using data store in the memory 209.

The starting location (such as a current location) may be identified using positional circuitry such as GPS or other positional inputs. The positioning circuitry 207, which is an example of a positioning system, is configured to determine a geographic position of the navigation device 122. The movement circuitry, which is an example a movement tracking system, is configured to determine movement of a navigation device 122. The position circuitry 207 and the movement circuitry may be separate systems, or segments of the same positioning or movement circuitry system. In an embodiment, components as described herein with respect to the navigation device 122 may be implemented as a static device. For example, such a device may not include movement circuitry, but may involve a speed or velocity detecting input device.

The controller 201 may identify its position as the device travels along a route using the positional circuitry. For indoor spaces without GPS signals, the navigation device 122 may rely on other geolocations methods such as LIDAR, radar, Wi-Fi, beacons, landmark identification, inertial navigation (dead reckoning), among others.

The controller 201 may request and receive data using the communications interface. The communications interface 205 may include any operable connection. An operable connection may be one in which signals, physical communications, and/or logical communications may be sent and/or received. An operable connection may include a physical interface, an electrical interface, and/or a data interface. The communication interface 205 provides for wireless and/or wired communications in any now known or later developed format. The communication interface 205 may include a receiver/transmitter for digital radio signals or other broadcast mediums.

At act A320, the controller 201 receives a route from a mapping system 121 or mapping service. The route may include one or more instructions or commands for a vehicle to perform to efficiently traverse a roadway network from the starting point to the destination. The instructions may include lane level maneuver instructions that detail when and how to change lanes while traversing the route. The lane level maneuver instructions may be generated as a function of stores historical lane level delay averages for road segments and lane maneuvers in the route.

The controller 201 may store the route or instructions in a memory 209. The memory 209 may be a volatile memory or a non-volatile memory. The memory 209 may include one or more of a read only memory (ROM), random access memory (RAM), a flash memory, an electronic erasable program read only memory (EEPROM), or other type of memory. The memory 209 may be removable from the mobile device 122, such as a secure digital (SD) memory card. The memory may contain a locally stored geographic database 123 or link node routing graph. The locally stored geographic database 123 may be a copy of the geographic database 123 or may include a smaller piece. The locally stored geographic database 123 may use the same formatting and scheme as the geographic database 123. The controller 201 may receive updated instructions, traffic data, lane maneuver delay values, or other data as the vehicle traverses the route.

At act A330, the controller 201 performs the instructions in order to traverse the route from the starting location to the destination. The controller 201 may provide the instructions to a driver or operator using the output interface 211. The output interface 211 may be a liquid crystal display (LCD) panel, light emitting diode (LED) screen, thin film transistor screen, or another type of display. The output interface 211 may also include audio capabilities, or speakers.

In an embodiment, the controller 201 performs the instructions automatically. The device 122 may be integrated into an autonomous vehicle or a highly-assisted or highly-automated driving (HAD) vehicle. The device 122 may be configured as a navigation system for an autonomous vehicle or a HAD. An autonomous vehicle or HAD may take route instruction based on the road segment and node information provided to the navigation device 122. An autonomous vehicle or HAD may be configured to receive instructions from a mapping system 121 or the controller 201 and automatically perform an action.

The device 122 may be integrated in the vehicle, which may include assisted driving vehicles such as autonomous vehicles, highly assisted driving (HAD), and advanced driving assistance systems (ADAS). Any of these assisted driving systems may be incorporated into device 122. Alternatively, an assisted driving device may be included in the vehicle. The assisted driving device may include memory, a processor, and systems to communicate with the device 122. The assisted driving vehicles may response to geographic data received from geographic database 123 and the server 125, which may have been updated.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed. Embodiment 1: A method for providing lane level maneuver guidance, the method comprising: receiving, by a processor, a first probe report for a vehicle comprising a first timestamp, a first road segment identifier, a first identifier for a first lane, and a first turn signal status indicating that a turn signal of the vehicle is active; receiving, by the processor, a second probe report for the vehicle comprising a second timestamp, a second road segment identifier, a second identifier for a second lane, and a second turn signal status indicating that the turn signal of the vehicle is off; calculating, by the processor, a lane maneuver delay value for the first lane to the second land as a function of the first timestamp and second timestamp; calculating, by the processor, an average maneuver delay value of a plurality of calculated lane maneuver delay values from the first lane to the second lane for the first road segment for a plurality of vehicles for a time period; and generating, by the processor, lane level maneuver instructions as a function of the average lane maneuver delay.

Embodiment 2

The method of embodiment 1, further comprising: augmenting, by the processor, a geographic database with the average lane maneuver delay value.

Embodiment 3

The method of embodiment 1, wherein the first road segment and the second road segment are the same road segment.

Embodiment 4

The method of embodiment 1, wherein the first road segment and the second road segment are part of a strand of road segments.

Embodiment 5

The method of embodiment 1, wherein there are no intersections between the first road segment and the second road segment.

Embodiment 6

The method of embodiment 1, wherein calculating the average maneuver delay value comprises: calculating average maneuver delay values for different classes of vehicles.

Embodiment 7

The method of embodiment 6, wherein the different classes of vehicles include at least passenger vehicles and trucks.

Embodiment 8

The method of embodiment 1, wherein the lane level maneuver instructions comprise an instruction to change from the first lane to the second lane prior to traversing the location.

Embodiment 9

The method of embodiment 1, wherein the lane level maneuver instructions are included in a requested route from a starting point to a destination.

Embodiment 10

A computer-readable, non-transitory medium storing a program that causes a computer to execute a method comprising: determining a plurality of time delays for a plurality of lane maneuvers by a plurality of vehicles from a first lane to a second lane at a location, wherein each of the plurality of time delays is calculated from an initial detection of a turn signal of a vehicle of the plurality of vehicles to a subsequent detection that the turn signal is off for a maneuver from the first lane to the second lane, wherein the location comprises a strand of road segments; generating a lane maneuver matrix for the road segment from the plurality of time delays; and generating at least one lane level routing command as a function of the lane maneuver matrix.

Embodiment 11

The non-transitory medium of embodiment 10, wherein the strand of road segments comprises a plurality of contiguous road segments with an angle between road segments greater than a predetermined threshold.

Embodiment 12

The non-transitory medium of embodiment 10, wherein determining a plurality of time delays comprises calculating average time delays for different classes of vehicles.

Embodiment 13

The non-transitory medium of embodiment 12, wherein the different classes of vehicles include at least passenger vehicles and trucks.

Embodiment 14

The non-transitory medium of embodiment 10, further comprising: transmitting the lane level routing commands to a navigation device.

Embodiment 15

A navigation system for collecting lane maneuver transition data, the navigation system comprising: a turn signal sensor configured to determine when a turn signal is on or off; a positioning sensor configured to identify a road segment and a lane position for a vehicle; a processor configured to generate a first probe report for a vehicle comprising a first timestamp, a first road segment identifier, a first identifier for a first lane, and a first turn signal status indicating that a turn signal of the vehicle is active; the processor further configured to generate a second probe report for the vehicle comprising a second timestamp, a second road segment identifier, a second identifier for a second lane, and a second turn signal status indicating that the turn signal of the vehicle is off; and a transceiver configured to transmit the first probe report and the second probe report to a mapping system.

Embodiment 16

The navigation system of embodiment 15, wherein the transceiver is further configured to receive lane level maneuver instructions from the mapping system; wherein the lane level maneuver instructions are generated based on a calculated average lane maneuver delay for a location.

Embodiment 17

The navigation system of embodiment 16, wherein lane level maneuver instructions comprise an instruction to change from the first lane to the second lane prior to traversing the location.

Embodiment 18

The navigation system of embodiment 15, wherein the first road segment and the second road segment are part of a strand of road segments.

Embodiment 19

The navigation system of embodiment 15, wherein there are no intersections between the first road segment and the second road segment.

Embodiment 20

The navigation system of embodiment 15, wherein the positioning sensor comprises a global positioning system.

We claim:

1. A method for providing lane level maneuver guidance, the method comprising:
  receiving, by a processor, a first probe report for a vehicle comprising a first timestamp, a first road segment identifier, a first identifier for a first lane, and a first turn signal status indicating that a turn signal of the vehicle is active;
  receiving, by the processor, a second probe report for the vehicle comprising a second timestamp, a second road segment identifier, a second identifier for a second lane, and a second turn signal status indicating that the turn signal of the vehicle is off;

calculating, by the processor, a lane maneuver delay value for the first lane to the second land as a function of the first timestamp and second timestamp;

calculating, by the processor, an average maneuver delay value of a plurality of calculated lane maneuver delay values from the first lane to the second lane for the first road segment for a plurality of vehicles for a time period; and generating, by the processor, lane level maneuver instructions as a function of the average lane maneuver delay.

2. The method of claim 1, further comprising:
augmenting, by the processor, a geographic database with the average lane maneuver delay value.

3. The method of claim 1, wherein the first road segment and the second road segment are the same road segment.

4. The method of claim 1, wherein the first road segment and the second road segment are part of a strand of road segments.

5. The method of claim 1, wherein there are no intersections between the first road segment and the second road segment.

6. The method of claim 1, wherein calculating the average maneuver delay value comprises:
calculating average maneuver delay values for different classes of vehicles.

7. The method of claim 6, wherein the different classes of vehicles include at least passenger vehicles and trucks.

8. The method of claim 1, wherein the lane level maneuver instructions comprise an instruction to change from the first lane to the second lane prior to traversing the location.

9. The method of claim 1, wherein the lane level maneuver instructions are included in a requested route from a starting point to a destination.

10. A computer-readable, non-transitory medium storing a program that causes a computer to execute a method comprising:
determining a plurality of time delays for a plurality of lane maneuvers by a plurality of vehicles from a first lane to a second lane at a location, wherein each of the plurality of time delays is calculated from an initial detection of a turn signal of a vehicle of the plurality of vehicles to a subsequent detection that the turn signal is off for a maneuver from the first lane to the second lane, wherein the location comprises a strand of road segments;

generating a lane maneuver matrix for the road segment from the plurality of time delays; and generating at least one lane level routing command as a function of the lane maneuver matrix.

11. The non-transitory medium of claim 10, wherein the strand of road segments comprises a plurality of contiguous road segments with an angle between road segments greater than a predetermined threshold.

12. The non-transitory medium of claim 10, wherein determining a plurality of time delays comprises calculating average time delays for different classes of vehicles.

13. The non-transitory medium of claim 12, wherein the different classes of vehicles include at least passenger vehicles and trucks.

14. The non-transitory medium of claim 10, further comprising:
transmitting the lane level routing commands to a navigation device.

15. A navigation system for collecting lane maneuver transition data, the navigation system comprising:
a turn signal sensor configured to determine when a turn signal is on or off;
a positioning sensor configured to identify a road segment and a lane position for a vehicle;
a processor configured to generate a first probe report for a vehicle comprising a first timestamp, a first road segment identifier, a first identifier for a first lane, and a first turn signal status indicating that a turn signal of the vehicle is active; the processor further configured to generate a second probe report for the vehicle comprising a second timestamp, a second road segment identifier, a second identifier for a second lane, and a second turn signal status indicating that the turn signal of the vehicle is off; and
a transceiver configured to transmit the first probe report and the second probe report to a mapping system.

16. The navigation system of claim 15, wherein the transceiver is further configured to receive lane level maneuver instructions from the mapping system; wherein the lane level maneuver instructions are generated based on a calculated average lane maneuver delay for a location.

17. The navigation system of claim 16, wherein lane level maneuver instructions comprise an instruction to change from the first lane to the second lane prior to traversing the location.

18. The navigation system of claim 15, wherein the first road segment and the second road segment are part of a strand of road segments.

19. The navigation system of claim 15, wherein there are no intersections between the first road segment and the second road segment.

20. The navigation system of claim 15, wherein the positioning sensor comprises a global positioning system.

* * * * *